United States Patent [19]

Harvey et al.

[11] Patent Number: 4,597,654
[45] Date of Patent: Jul. 1, 1986

[54] CODED ROLL FILM HOLDER AND CODE RESPONSIVE CAMERA

[75] Inventors: Donald M. Harvey, Webster; Neil G. Seely, Rochester, both of N.Y.

[73] Assignee: Eastman Kodak Company, Rochester, N.Y.

[21] Appl. No.: 707,933

[22] Filed: Mar. 4, 1985

[51] Int. Cl.⁴ .................. G03B 7/24; G03B 17/02; G03B 19/04

[52] U.S. Cl. ................. 354/21; 354/159; 354/216

[58] Field of Search ............ 354/21, 159, 210, 216, 354/275; 352/78 C, 79

[56] References Cited

U.S. PATENT DOCUMENTS

| | | | |
|---|---|---|---|
| 1,690,673 | 11/1928 | Forst | 354/159 |
| 2,002,076 | 5/1935 | Bornmann et al. | 95/31 |
| 2,247,104 | 6/1941 | Takacs | 95/31 |
| 2,716,929 | 9/1955 | Smith | 354/216 |
| 3,395,965 | 8/1968 | Teshi et al. | 352/79 |
| 3,440,943 | 4/1969 | Saver | 354/21 |
| 3,561,851 | 2/1971 | Martin | 352/78 R |
| 3,691,918 | 9/1972 | Tenne | 354/21 |
| 3,811,759 | 5/1974 | Johnson et al. | 352/78 C X |
| 3,832,728 | 8/1974 | Faris et al. | 354/210 |
| 4,435,060 | 3/1984 | Kobayashi | 354/210 X |

Primary Examiner—William B. Perkey
Attorney, Agent, or Firm—Roger A. Fields

[57] ABSTRACT

A plurality of roll film holders are individually coded to indicate respective negative sizes, such as 2¼×1⅝ ins. and 2¼×2¾ ins., on separate rolls of similar type film. A multi-format camera for taking pictures in the different sizes is adapted to receive the film holders. The camera includes a variable size exposure area and code responsive means for determining the effective size of the exposure area in accordance with the negative size coded on a film holder received in the camera.

6 Claims, 9 Drawing Figures

CODED ROLL FILM HOLDER AND CODE RESPONSIVE CAMERA

CROSS REFERENCE TO RELATED APPLICATIONS

Reference is made to commonly assigned, copending patent applications Ser. No. 707,932, filed Mar. 4, 1985 in the name of Neil G. Seely and entitled METERING ROLL FILM HOLDERS AND MULTI-FORMAT CAMERA, and Ser. No. 707,934, filed Mar. 4, 1985 in the names of Neil G. Seely and Donald M. Harvey and entitled ROLL FILM HOLDERS AND MULTI-FORMAT CAMERA.

BACKGROUND OF THE INVENTION

1. Field of the Invention

The invention generally relates to roll film holders and to roll film cameras. More particularly, the invention relates to roll film holders coded to indicate respective formats, i.e., picture sizes, and to a code responsive multi-format camera for taking pictures in the different sizes.

2. Description of the Prior Art

Roll (non-perforated) film is backed with an opaque paper strip which has printed numbers corresponding to the number of negative spaces on the film. The most popular roll film, probably size 120 film, is approximately 2.45 ins. (6.22 cm.) wide. The backing paper on size 120 film has several series of numbers. A first series is numbered proximate one longitudinal edge of the paper to give 16 exposures to the roll measuring $2\frac{1}{4} \times 1\frac{5}{8}$ ins. (6×4.5 cm.). Another series is numbered along the longitudinal center of the paper to give 12 exposures measuring $2\frac{1}{4} \times 2\frac{1}{4}$ ins. (6×6 cm.). A third series is numbered proximate the other longitudinal edge of the paper to give 8 exposures measuring $2\frac{1}{4} \times 3\frac{1}{4}$ ins. (6×9 cm.). A fourth useful possibility, which is not numbered on the paper, is 10 exposures to the roll measuring $2\frac{1}{4} \times 2\frac{3}{4}$ ins. (6×7 cm.).

Roll film cameras equipped to take pictures in two or more of the different sizes, i.e., $2\frac{1}{4} \times 1\frac{5}{8}$ ins., $2\frac{1}{4} \times 2\frac{1}{4}$ ins., $2\frac{1}{4} \times 3\frac{1}{4}$ ins., and $2\frac{1}{4} \times 2\frac{3}{4}$ ins., on separate rolls of film having the same length and width, are referred to as multi-format cameras. Many of these cameras are used with several roll film holders for taking the respective size pictures. Each of the roll film holders have the same exterior dimensions and include a fixed mask which defines an exposure area for taking a particular size picture. To take pictures in a different size, the roll film holder being used must be removed from the camera and replaced by a film holder corresponding to the desired picture size.

Although the use of several roll film holders for taking the respective size pictures is commonplace, the mask opening in each of the holders which defines the exposure area must be precise to assure the correct negative size. This increases the manufacturing cost of the film holders and makes ownership of several holders a relatively expensive undertaking.

In contrast, U.S. Pat. No. 2,002,076 discloses a multi-format camera for use with a single roll film holder for taking two different size pictures, i.e., half-frame and full-frame pictures. The roll film holder has a pair of pivotally mounted exposure size determining flaps which are manually operated, previous to loading the film holder in the camera, to change the size of the exposure area from half-frame to full-frame or vice versa. Picture-taking with this camera is limited by the single roll film holder to two formats and, as in the other example, the film holder is relatively expensive.

Other multi-format cameras are adapted to receive several film holders having different exterior dimensions, as shown in U.S. Pat. No. 3,832,728. This requires the camera to have suitable means for positioning the different size holders with respect to the optical axis of the taking lens in the camera.

SUMMARY OF THE INVENTION

The above-described problems regarding prior art roll film holders and multi-format cameras are believed solved by the invention. Generally, the invention provides improved roll film holders coded to indicate respective picture sizes and a code responsive multi-format camera for taking pictures in the different sizes.

According to the invention, a plurality of roll film holders are individually coded to indicate respective negative sizes, such as $2\frac{1}{4} \times 1\frac{5}{8}$ ins., $2\frac{1}{4} \times 2\frac{1}{4}$ ins., $2\frac{1}{4} \times 3\frac{1}{4}$ ins., and $2\frac{1}{4} \times 2\frac{3}{4}$ ins., on separate rolls of similar type film, e.g. size 120 film. A multi-format camera for taking pictures in the different sizes is adapted to receive the film holders. The camera includes a variable size exposure area and code responsive means for determining the effective size of the exposure area in accordance with the negative size coded on a film holder received in the camera.

In the preferred embodiment, the roll film holders have substantially the same exterior dimensions and respective coded regions with cut-outs present or absent at predetermined locations to indicate the different negative sizes. The multi-format camera is adapted to position a film holder received in the camera to support successive portions of the roll film in the focal plane of a taking lens. A rectangular-shaped opening in the camera defines an exposure area for recording a picture on a film portion in the focal plane. Masking members in the camera are supported for movement relative to the opening to change the exposure area to respective sizes corresponding to the different negative sizes. Cut-out sensing members are located in the space to be occupied by the coded region of a film holder received in the camera. The sensing members are supported to enter the cut-outs in the film holder or to be depressed by the film holder in the absence of such cut-outs. Motion transmitting means connect the sensing members and the masking members to move the masking members in response to depression of the sensing members. Thus, the effective size of the exposure area in the camera can be set in accordance with the negative size coded on a film holder received in the camera.

BRIEF DESCRIPTION OF THE DRAWINGS

The invention will be described in connection with the drawings, wherein.

DESCRIPTION OF THE PREFERRED EMBODIMENT

The invention is disclosed as being embodied in a pair of roll film holders for two different negative sizes and in a dual-format camera adapted to receive the film holders. Because such film holders and cameras are well known, this description is directed in particular to those elements forming part of or cooperating directly with the disclosed embodiment of the invention. It is to be understood, however, that other elements not specifically shown or described may take various forms known to persons of ordinary skill in the art.

Figure 1:
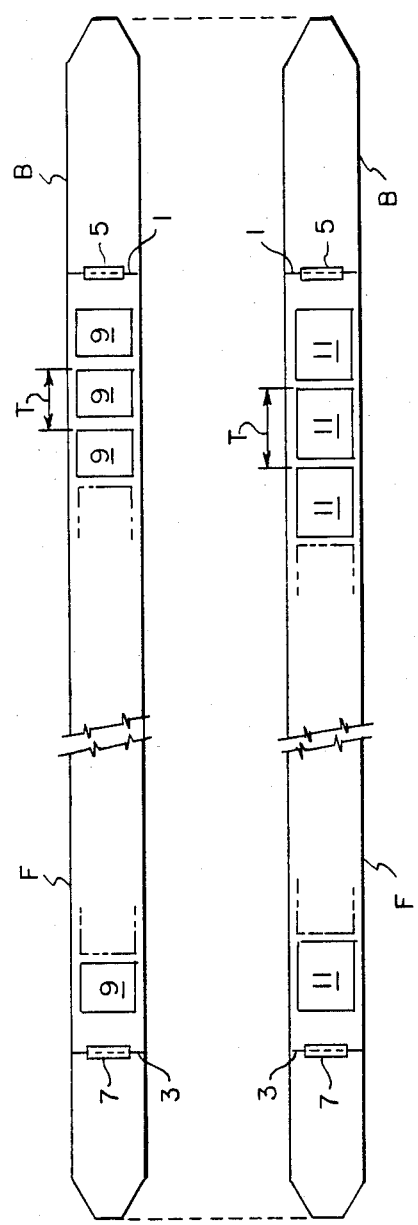
FIG. 1 is a plan view of size 120 roll film and backing paper, depicting the film in two instances with different size exposures.

Referring now to the drawings, and in particular to FIG. 1, there is shown two similar rolls of a conventional size 120 film, such as Kodak Verichrome Pan film for black and white prints. In each instance, the film roll is laid out flat to reveal the full length of the film F and an opaque backing paper B. The film F is attached to the backing paper B at leading and trailing ends 1 and 3 of the film by respective adhesive-backed pasters 5 and 7. As shown in FIG. 1, the upper film roll has sixteen exposures 9 each measuring $2\frac{1}{4} \times 1\frac{5}{8}$ ins. (6×4.5 cm.). The dimension $2\frac{1}{4}$ ins. represents the width of an exposure 9 measured across the film F, and the dimension $1\frac{5}{8}$ ins. represents the length of the exposure measured along the film. The lower film roll has ten exposures 11 each measuring $2\frac{1}{4} \times 2\frac{3}{4}$ ins. (6×7 cm.). Similarly, the dimension $2\frac{1}{4}$ ins. represents the width of an exposure 11 and the dimension $2\frac{3}{4}$ ins. represents the length of the exposure. As depicted, the two film rolls have the same length and the same width. However, the length T of film travel between the successive exposures 9 or 11 on the two film rolls will be different because of the difference in exposure length, i.e., $1\frac{5}{8}$ ins. and $2\frac{3}{4}$ ins., on such rolls. In FIG. 1, the length T between the leading side of one exposure 9 on the upper film roll and the leading side of the next exposure on such roll is $1\frac{7}{8}$ ins. (4.8 cm.), and the length T between the leading side of one exposure 11 on the lower film roll and the leading side of the next exposure on such film roll is 3 ins. (7.6 cm.).

Figure 2:
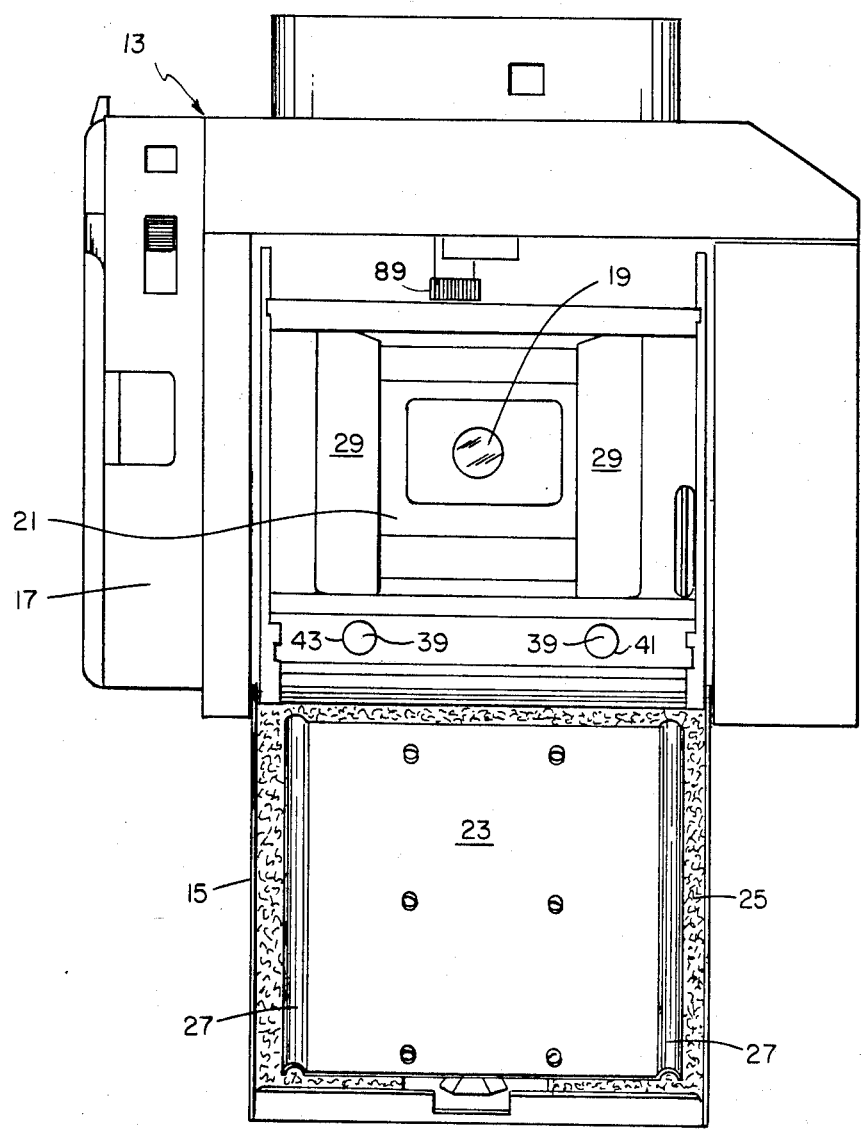
FIG. 2 is a rear elevation view of a dual-format camera for taking pictures in the two different sizes, according to a preferred embodiment of the invention.

A dual-format camera 13 is illustrated in FIG. 2 for taking pictures in the two different sizes $2\frac{1}{4} \times 1\frac{5}{8}$ ins. and $2\frac{1}{4} \times 2\frac{3}{4}$ ins. on separate rolls of the film F, shown in FIG. 1. The dual-format camera 13 is depicted with a back door 15 pivoted open from a camera body 17. A taking lens 19 centrally arranged at the front of the camera body 17 forms a focal plane within the camera body. A rectangular-shaped opening 21 in the camera body 17 is centered on the optical axis of the taking lens 19. The rectangular-shaped opening 21 defines a similar shaped exposure area for recording a picture on a film portion lying in the focal plane of the lens 21. A resiliently flexible plate 23 connected to the back door 15 rests on a sponge-like backing pad 25 which serves as a light lock. The plate 23 has a pair of raised edge sections 27 for supporting a roll film holder received in the camera body 17, to position successive portions of the roll film in the focal plane.

Figure 3:
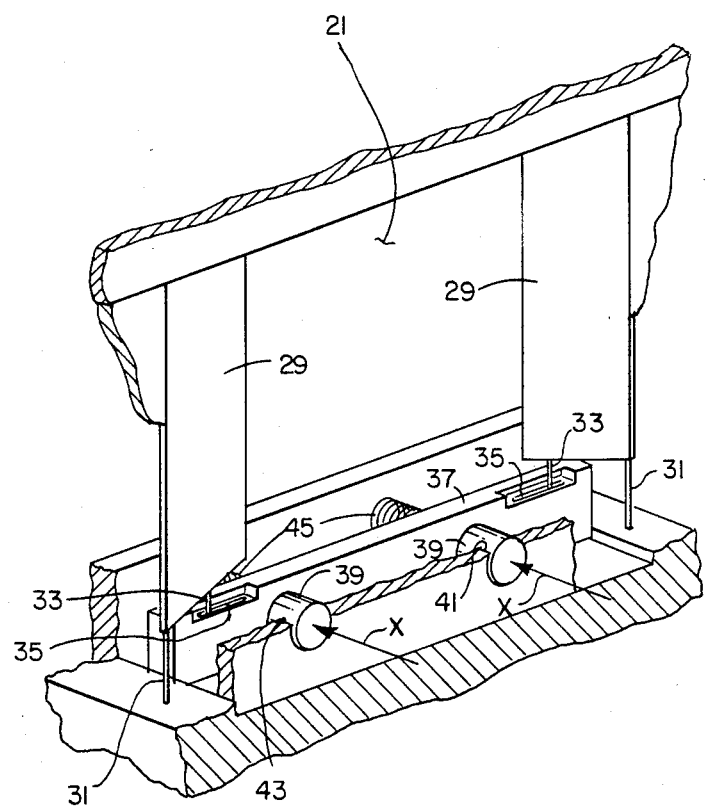
FIG. 3 is a rear perspective view of a masking mechanism in the camera for changing the effective size of the exposure area in conformity with the particular size of the pictures to be taken.

As shown in FIG. 3, a pair of masking flaps 29 are supported within the camera body for swinging movement on separate pivot posts 31 to change the actual size of the opening 21 defining the exposure area to respective sizes corresponding to the two picture sizes, $2\frac{1}{4} \times 1\frac{5}{8}$ ins. and $2\frac{1}{4} \times 2\frac{3}{4}$ ins. The two masking flaps 29 are movable between a masking position, depicted in FIG. 2, covering opposite end portions of the opening 21 to reduce the effective size of the exposure area to $2\frac{1}{4} \times 1\frac{5}{8}$ ins. and a non-masking position, depicted in FIG. 3, removed from the opposite end portions of the opening to enlarge the effective size of the exposure area to $2\frac{1}{4} \times 2\frac{3}{4}$ ins. Each of the masking flaps 29 includes a cam follower pin 33 having a free end movably disposed within a cam slot 35 in a motion transmitting bar 37. The motion transmitting bar 37 includes a pair of depressible posts 39 supported for longitudinal movement in respective openings 41 and 43. When the two posts 39 are pushed inward of the openings 41 and 43, as indicated by the pair of arrows X in FIG. 3, the bar 37 is shifted in the same direction to move the two masking flaps 29 to their non-masking position. Normally, however, a pair of helical compression springs 45 bearing against the bar 37 urge the mask flaps 29 to their masking position and urge the posts 39 outward of the openings 41 and 43.

Figure 4A:
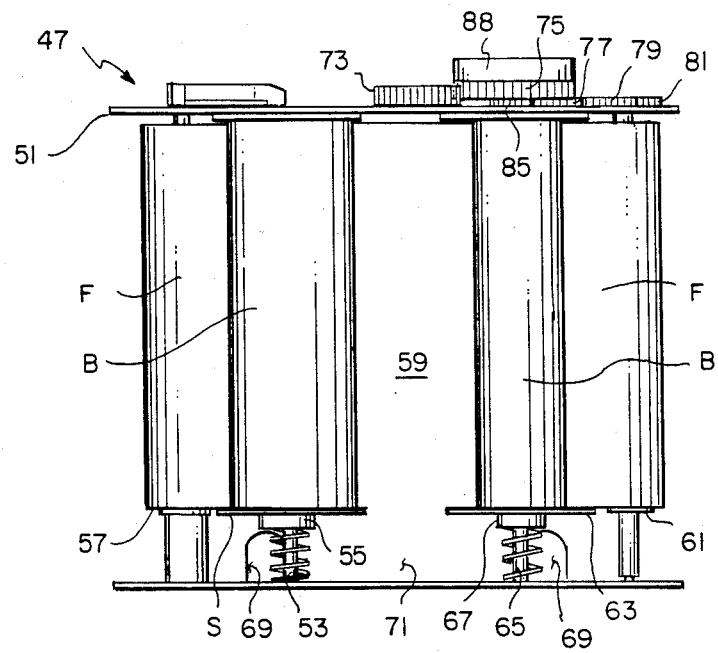
FIGS. 4A and 4B are rear elevation views of respective roll film holders for the different size exposures, according to the preferred embodiment of the invention.
Figure 4B:
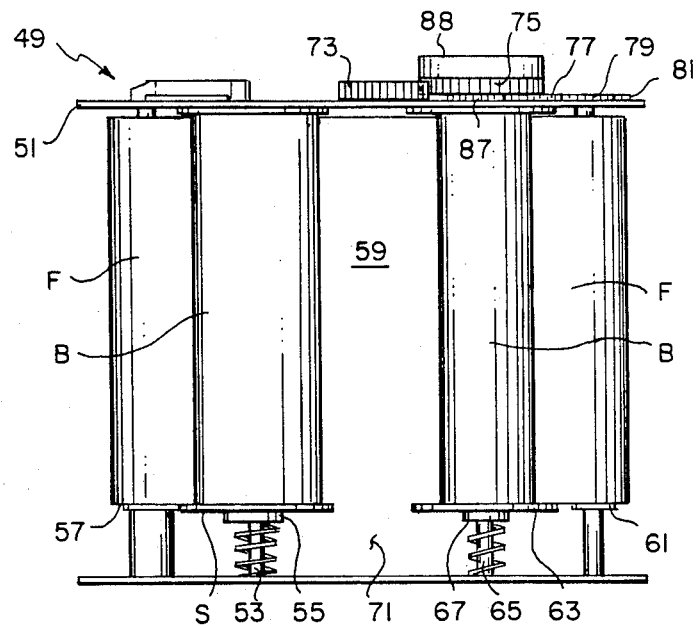

FIG. 4A shows a roll film holder 47 used in the camera 13 to take $2\frac{1}{4} \times 1\frac{5}{8}$ ins. pictures on the roll film F. FIG. 4B shows a roll film holder 49 used in the camera 13 to take $2\frac{1}{4} \times 2\frac{3}{4}$ ins. pictures on the roll film F. Where the two roll film holders 47 and 49 are identical, the same reference numbers are used in describing their respective components. Otherwise, different reference numbers are used.

Each of the film holders 47 and 49 includes a frame 51 generally having the same dimensions for carrying a similar length roll of the film F. The film F is provided (in unexposed form) wound on a supply spool S with the backing paper B at the outer side of each convolution of the roll. The supply spool S is supported for rotation on a fixed post 53 on the frame 51, and is held in the proper unwinding position by a spring-urged washer 55 movable along the fixed post. During picture-taking in the camera 13, the film F (with the backing paper B) is advanced from the supply spool S, around an idler roller 57 on the frame 51, over a flat exposure plate 59 comprising part of the frame, around a metering roller 61 on the frame, and onto a take-up spool 63. The take-up spool 63 is supported for rotation on a fixed post 65 on the frame 51, and is held in the proper winding position by a spring-urged washer 67 movable along the fixed post. As shown in FIGS. 4A and 4B, the film F is advanced over the idler roller 57, the exposure plate 59, and the metering roller 61, with the backing paper B located between the film and these components. In contrast, the film F is wound onto the take-up spool 63 with the backing paper B at the outer side of each convolution of the roll.

Figure 6:
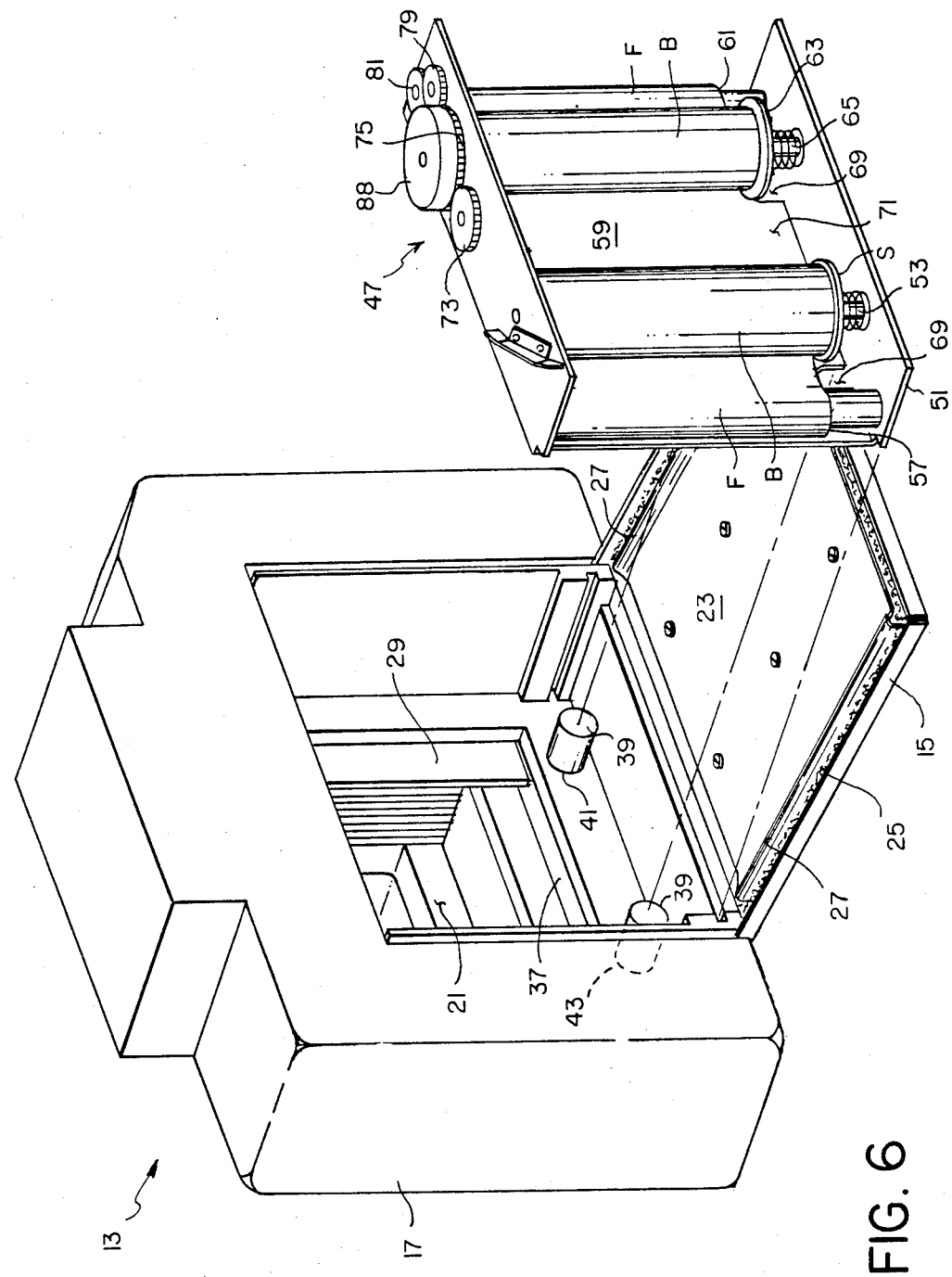
FIG. 6 is an exploded perspective view of one of the film holders loaded in the camera.

The roll film holder 47 includes a pair of coded means representative of the $2\frac{1}{4} \times 1\frac{5}{8}$ ins. picture size. The two coded means on the film holder 47 are depicted in FIG. 4A as a pair of identical cut-outs 69 in the exposure plate 59, at respective predetermined locations along a coded region 71 on that plate. The predetermined locations of the two cut-outs 69 are chosen such that when the film holder 47 is loaded into the camera body 17, as shown in FIG. 6, the two depressible posts 39 on the motion transmitting bar 37 will enter the respective cut-outs. This permits the pair of masking flaps 29 to remain in their masking position, to maintain the effective size of the exposure area (defined by the opening 21) at $2\frac{1}{4} \times 1\frac{5}{8}$ ins.

Figure 7:
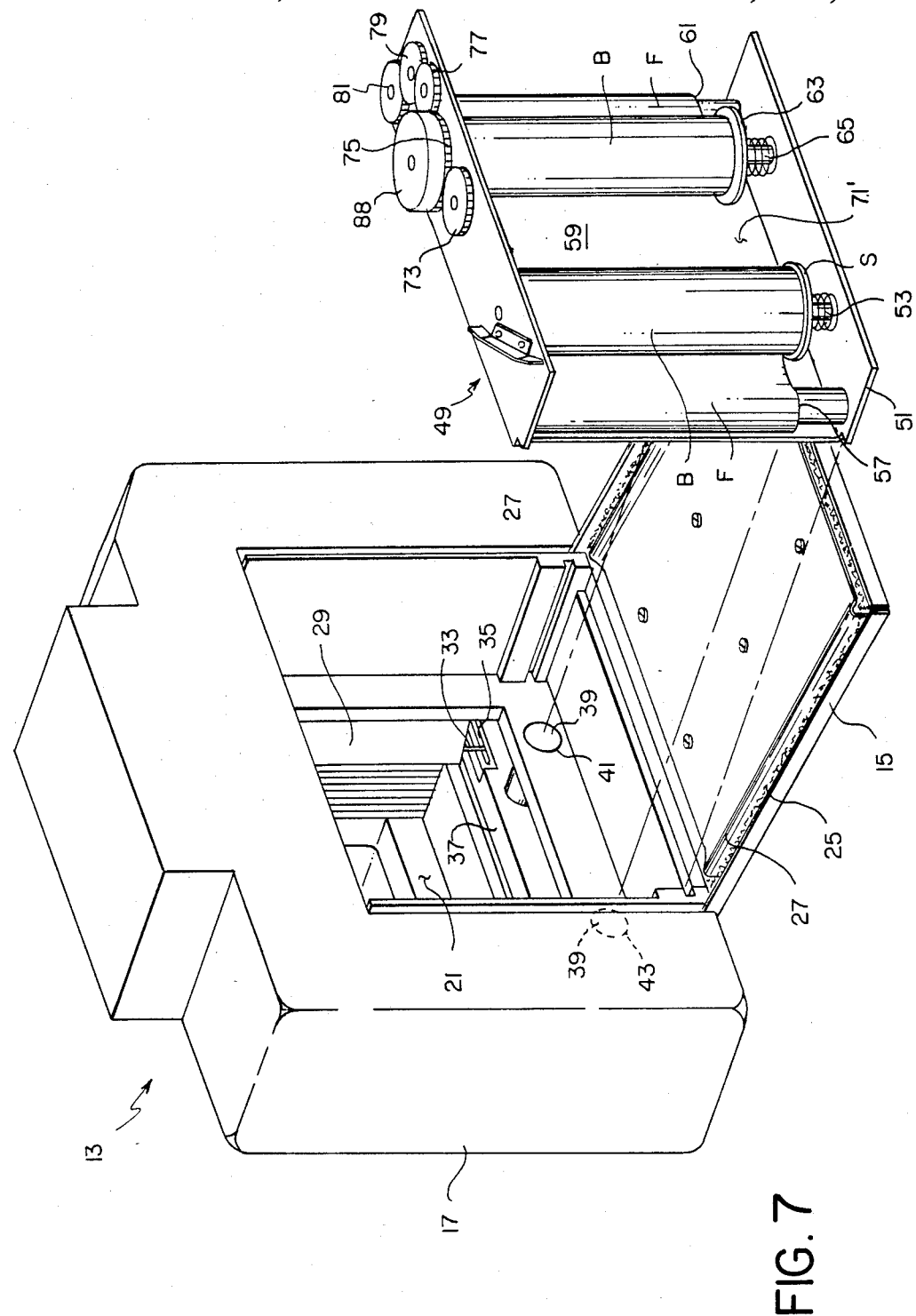
FIG. 7 is an exploded perspective view of the other film holder loaded in the camera.

The roll film holder 49 includes a pair of coded means representative of the $2\frac{1}{4} \times 2\frac{3}{4}$ in. picture size. The two coded means on the film holder 49 are depicted in FIG. 4B by the absence of respective cut-outs at the same two locations as occupied by the pair of cut-outs 69 on the film holder 47. That is to say, the coded region 71' on the film holder 49 is distinguished from the coded region 71 on the film holder 47 by the presence of respective portions of the exposure plate 59 where the two cut-outs 69 would otherwise be present. Thus, when the film holder 49 is loaded into the camera body 17, as shown in FIG. 7, the two posts 39 on the bar 37 will be pushed into the respective openings 41 and 43 by the exposure plate 59, thereby moving the pair of masking flaps 29 to their nonmasking position and enlarging the effective size of the exposure area to $2\frac{1}{4} \times 2\frac{3}{4}$ ins.

Figure 5A:
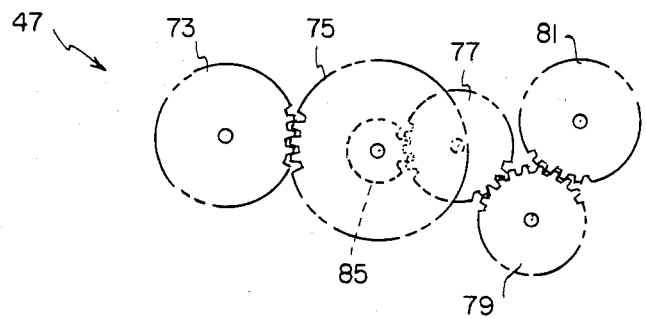
FIGS. 5A and 5B are plan views of respective gearing mechanisms in the two roll film holders for metering the roll film in different length increments between successive exposures.
Figure 5B:
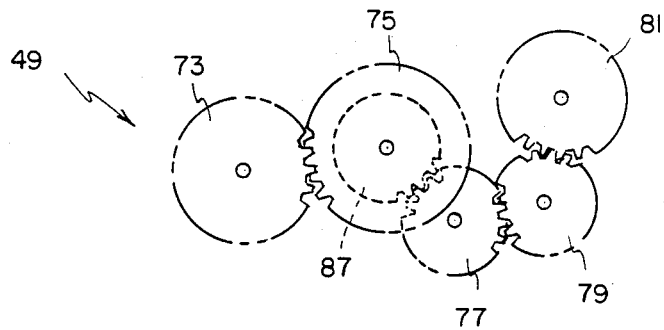

The film holder 47 includes metering means corresponding to the $2\frac{1}{4} \times 1\frac{5}{8}$ ins. picture size, for advancing the roll film F in $1\frac{7}{8}$ in. increments between successive exposures to provide sixteen exposures 9 to the roll. Conversely, the film holder 49 includes metering means corresponding to the $2\frac{1}{4} \times 2\frac{3}{4}$ ins. picture size, for advancing the roll film F in 3 in. increments between successive exposure to provide ten exposures 11 to the roll. The respective metering means for the film holders 47 and 49 are shown in FIGS. 4A, 5A and 4B, 5B. In essence, the two film holders 47 and 49 have identical actuating gears 73 engaging identical take-up gears 75, mounted in coaxial relation with the take-up spools 63, to rotate either one of such spools at the same speed on the two film holders when a corresponding one of the actuating gears is rotated. Also, the two film holders 47 and 49 have similar pairs of intermediate engaging gears 77 and 79. The respective intermediate gears 79 engage similar roller gears 81, mounted in coaxial relation with the metering rollers 61. The metering roller 61 on the film holder 47 must be rotated at a slower speed than the metering roller 61 on the film holder 49 to effect less film travel between successive exposures when using the first-mentioned holder. To accomplish this, the film holder 47 has a smaller size reduction or metering gear 85 than the other reduction or metering gear 87 on the film holder 49. As shown in FIG. 5A, the metering gear 85 is fixed in coaxial relation to the take-up gear 75 on the film holder 47 and has 16 teeth disposed to engage the intermediate gear 77 on that film holder. As shown in FIG. 5B, metering gear 87 is fixed in coaxial relation to the take-up gear 75 on the film holder 49 and has 26 teeth disposed to engage the intermediate gear 77 on that film holder. Thus, even though the metering gears 85 and 87 will be rotated at the same speed on the respective film holders 45 and 47, in response to rotation of the actuating gears 73 at the same speed on the two film holders, the intermediate gear 77 and therefore the metering roller 61 on the film holder 47 will be rotated at a slower speed than the same gear and roller on the film holder 49.

On each of the film holders 47 and 49, the pair of intermediate engaging gears 77 and 79 are arranged between the metering gear 85 or 87 and the roller gear 81 to cause the metering roller 61 to rotate at a slower speed than the take-up spool 63. This tensions the film length between the metering roller and the take-up spool. A slip clutch 88, shown in FIGS. 4A and 4B, is provided to prevent the film length from being overly tensioned, to avoid damaging the roll film F.

The multi-format camera 13, as shown in FIG. 2, includes a single speed drive gear 89 positioned for separate engagement with the respective actuating gears 73 on the film holders 47 and 49 when either one of the holders is loaded in the camera body 17. A known motor, not shown, is provided for rotating the single speed drive gear 89 between successive exposures to advance the roll film F in the different length increments i.e., $1\frac{7}{8}$ in. and 3 in., determined by the respective metering gears 85 and 87 on the film holders 47 and 49. Alternatively, known manually operated means may be provided for rotating the drive gear 89 between exposures.

Other details of the respective metering means on the film holders 47 and 49 for advancing the roll film F in $1\frac{1}{2}$ in. and 3 in. increments between exposures are disclosed in copending Ser. No. 707,932 entitled METERING ROLL FILM HOLDER AND MULTI-FORMAT CAMERA and more fully cross-referenced above.

While the invention has been described with reference to a preferred embodiment, it will be understood that various modifications may be effected within the ordinary skill in the art without departing from the scope of the invention. For example, instead of using the invention with only two picture sizes, $2\frac{1}{4} \times 1\frac{5}{8}$ ins. and $2\frac{1}{4} \times 2\frac{3}{4}$ ins., the invention may be used with numerous other picture sizes, such as $2\frac{1}{4} \times 2\frac{1}{4}$ ins. and $2\frac{1}{4} \times 3\frac{1}{4}$ ins.

We claim:

1. A multi-format camera for taking pictures in a number of sizes, and adapted to receive a plurality of roll film holders individually coded to indicate the respective picture sizes, said camera comprising:

a taking lens for forming a focal plane;

means for positioning a film holder received in said camera to support successive portions of the roll film in the focal plane;

means for defining a variable size exposure area to record different size pictures on respective film portions in the focal plane and for maintaining the exposure area centered with respect to the same point as the size of the exposure area is changed; and code responsive means for determining the effective size of the exposure area in accordance with the picture size coded on a film holder received in said camera.

2. A multi-format camera for taking pictures in a plurality of sizes on separate rolls of similar length film, and adapted to receive a plurality of roll film holders for the different picture sizes having (a) respective frames with substantially similar dimensions for carrying the similar length rolls and (b) respective coded means representative of the different picture sizes, said camera comprising:

a taking lens for forming a focal plane;

means for positioning a film holder received in said camera to support successive portions of the roll film in the focal plane;

means for defining an exposure area to record a picture on a film portion in the focal plane, said defining means including masking means supported for movement to change the exposure area to respective sizes for recording the picture in any of the different sizes without shifting the exposure area relative to its center;

means for moving said masking means; and means, connected to said moving means, for sensing the coded means of a film holder received in said camera to determine whether or not said masking means should be moved, whereby a picture with the particular size represented by such coded means may be recorded.

3. A multi-format camera as recited in claim 2, wherein the coded means of one film holder includes a coded region having a coding structure present at a predetermined location in the coded region to represent one picture size and the coded means of another film holder includes a similar region without the coding structure at the same location to represent another picture size, and wherein said code sensing means of said camera includes a structure sensing member located in a space adjacent the predetermined location in the coded region of a film holder received in the camera and means supporting said structure sensing member to be moved by a coding structure present at the predetermined location or to remain stationary in the absence of the coding structure at such location.

4. A multi-format camera as recited in claim 3, wherein said masking means includes a masking member supported for movement between a masking position covering part of the exposure area to reduce the effective size of the area and a non-masking position removed from the exposure area to enlarge the effective size of the area, and said means for moving said masking means includes motion transmitting means connected to said structure sensing member.

5. A multi-format camera for taking pictures in a relatively larger size and in a relatively smaller size, and adapted to receive (a) one film holder for the larger picture size having a coding structure representative of the larger size and (b) another film holder for the smaller picture size without such coding structure, said camera comprising:

means for defining an exposure area to take a picture in the larger or smaller size without shifting the exposure area relative to its center, said defining means including masking means supported for movement in one direction to reduce the effective size of the exposure area to take a picture in the smaller size and for movement in another direction to enlarge the effective size of the exposure area to take a picture in the larger size;

means for urging said masking means to move in the one direction to maintain the exposure area in the reduced size; and means, responsive to the coding structure of a film holder for the larger picture size, for moving said masking means in the other direction to change the exposure area to the enlarged size.

6. A multi-format camera for taking pictures in a plurality of sizes on separate rolls of similar length film, and adapted to receive a plurality of film holders for the different picture sizes having (a) respective frames with substantially similar dimensions for carrying the similar length rolls and (b) respective coded regions with cut-outs present or absent to indicate the different picture sizes, said camera comprising:

a taking lens for forming a focal plane;

means for positioning a film holder received in said camera to support successive portions of the roll film in the focal plane;

means for defining an exposure area to record a picture on a film portion in the focal plane, said defining means including masking means supported for movement to change the exposure area to respective sizes for recording the picture in any of the different sizes without shifting the exposure area relative to its center;

cut-out sensing members located in the space to be occupied by the coded region of a film holder received in said camera, said sensing members being supported to enter the respective cut-outs in the film holder or to be depressed by the film holder in the absence of such cut-outs; and means connecting said masking means and said cut-out sensing members in motion transmitting relation for moving said masking means in response to depression of said sensing members.

* * * * *